United States Patent Office 2,696,427
Patented Dec. 7, 1954

2,696,427

STABILIZED FUEL OIL COMPOSITIONS

Charles B. Biswell, Woodstown, N. J., assignor to E. I. du Pont de Nemours and Company, Wilmington, Del., a corporation of Delaware No Drawing. Application January 26, 1951, Serial No. 208,072

10 Claims. (Cl. 44—63)

This invention relates to fuel oil compositions stabilized against deterioration during storage, and particularly to compositions containing fuel oil produced by a catalytic cracking process.

Light fuel oils used for domestic heating are produced from straight-run distillates, and also by the thermal cracking and catalytic cracking of heavier oils. Until recently most fuel oils were made from straight-run distillates, but it is now appreciated that they may be obtained more economically by the catalytic cracking of crude stocks. For this reason, catalytic cracking is the method most generally used to obtain oil with which to satisfy the increasing demand for distillate fuel oils. Several companies are now marketing blends containing 20 to 60 percent catalytically cracked stocks with straight-run fuels. From a cost and yield standpoint, it would be desirable to increase the proportion of catalytically cracked stock or to sell catalytically cracked oil exclusively. However, this has not heretofore been practical because of a serious storage stability problem which is particularly acute with catalytically cracked oil.

Light fuel oils are subject to deterioration during storage and catalyticaly cracked fuel oil in particular is very unstable. The deterioration apparently is caused by the mild but prolonged oxidizing conditions existing during storage and results in discoloration of the oil and in the formation of sludge or sediment, which if not removed plugs filter screens, orifices and other parts of the equipment used in burning the fuel.

The high susceptibility to deterioration of catalytically cracked fuel oils has made it necessary to blend them off with large proportions of the less plentiful but more stable straight-run stocks to meet the minimum stability requirements. Nevertheless, many companies have experienced difficulty with these fuels and refiners are frequently forced to take back from the distributors off-color oil containing considerable oil insoluble residue.

Although the deterioration of fuel oils appears to involve oxidation, many of the antioxidants used in the stabilization of gasoline, rubber and other organic compounds subject to deterioration under the influence of oxygen are ineffective as stabilizers for fuel oil. The following conventional gasoline antioxidants fail to inhibit the deterioration of catalytic cracked fuel oil: N-n-butyl-p-aminophenol, N,N'-di(sec-butyl)-p-phenylenediamine, 2,6-di(tert-butyl)-4-methylphenol. The following conventional rubber antioxidants, some of which are also used as lubricating grease stabilizers, are similarly ineffective in stabilizing catalytic cracked fuel oil: hydroquinone monobenzylether, monoheptyldiphenylamine, diheptyldiphenylamine, p-ethoxyphenyl-beta-naphthylamine, phenyl-alpha-naphthylamine, phenyl-beta-naphthylamine, 2,4-diaminodiphenylamine, alkylated polyhydroxyphenol, p-hydroxyphenylmorpholine, N,N'-diphenylethylenediamine, p,p'-dimethoxydiphenylamine.

The object of this invention is to provide compositions containing fuel oil which are stabilized against rapid deterioration during storage with consequent discoloration and sludge formation.

I have found that compositions stabilized against deterioration during storage may be prepared by incorporating with the fuel oil a small amount of a phenolic triamine having the formula:

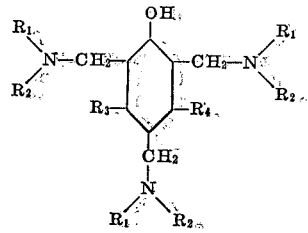

in which R₁ and R₂ are selected from the group consisting of aliphatic radicals containing 1 to 2 carbon atoms and divalent aliphatic radicals which jointly with the nitrogen atom form a heterocyclic ring, and R₃ and R₄ are selected from the group consisting of hydrogen, methyl and ethyl.

Representative members of this class of compounds which are effective fuel oil stabilizers are:

2,4,6-tri(dimethylaminomethyl) phenol
2,4,6-tri(piperidinomethyl) phenol
2,4,6-tri(pyrrolidinomethyl) phenol
2,4,6-tri(dimethylaminomethyl)-3-methyl phenol
2,4,6-tri(dimethylaminomethyl)-3-ethyl phenol
2,4,6-tri(dimethylaminomethyl)-3,5-dimethyl phenol Other typical compounds of this class are those in which the phenol is substituted in the 2, 4 and 6 positions with diethylaminomethyl, methylethylaminomethyl, diethanolaminomethyl, piperazinomethyl, morpholinomethyl or pyrrolomethyl radicals.

Compounds of this sort may be prepared by reacting one mole of phenol with at least three mole equivalents each of formaldehyde and a secondary amine, as described by Bruson and MacMullen, J. A. C. S. 63, 270 (1941).

I have also found that the phenolic triamine stabilizers are particularly effective when used in conjunction with small amounts of metal deactivators of the o-hydroxyaralkylidene aliphatic amine type, and particularly the o-hydroxybenzal aliphatic amines. A useful group of deactivators for this purpose is the N,N'-di(o-hydroxyaralkylidene) alkylenediamines in which the amino groups are attached to different carbon atoms in the alkylene group, as for example, the compound N,N'-di(o-hydroxybenzal)-1,2-diaminopropane. Deactivator compounds of this sort may be prepared by the condensation of aliphatic amines with o-hydroxy aromatic aldehydes or ketones. Other compounds falling within this class which may be used in conjunction with phenolic triamines in the practice of this invention are N,N'-di(o-hydroxy-3-methoxybenzal) ethylenediamine, N,N'-di(o-hydroxybenzal) decamethylenediamine, N,N'-di(o-hydroxybenzal) triethylenetetramine, N,N'-di(o-hydroxybenzal) ethylenediamine and N,N'-di(o-hydroxybenzal) 1,3-diaminopropane. Another deactivator which is particularly effective in this connection is o-hydroxybenzalaminoguanidine oleate. Mixtures of two or more deactivators may be employed with the phenolic triamine stabilizer.

The preferred concentration of stabilizing agent in the composition will vary somewhat depending on the characteristics of the particular fuel oil to be stabilized, and also on the stabilizing agent or combination of agents to be used. In general additions of from 0.0005 to 0.05 percent by weight of the triamine or of the mixture of triamine and deactivator effectively inhibit the deterioration of the fuel oil, while concentrations of from 0.001 to 0.01 percent represent the preferred range. Smaller amounts of stabilizers usually provide an insufficient degree of inhibition, while greater amounts are needlessly wasteful of the stabilizing agent.

When a metal deactivator is employed, it may be mixed with the triamine and the mixture added to the fuel oil, or the two ingredients may be added separately. In most cases the mixture should contain a major amount of the triamine and a minor amount of the deactivator. A preferred composition contains nine parts by weight of the triamine to one part of the deactivator, although mixtures containing from 50 to 95 parts by weight of triamine with 5 to 50 parts of the deactivator are effective. Although the metal deactivator serves to suppress the catalytic effect of copper in promoting the oxidation of fuel oil, this does not appear to be its only function, as even where no copper is present the mixture of triamine and deactivator shows advantages.

The effect of these various agents in preventing the deterioration of fuel oil is measured by an accelerated stability test. In this test 50 ml. of the oil to be tested are charged into a glass container and the container is placed in a suitable bomb and subjected to a pressure of 100 lbs. of oxygen at 210°–212° F. for ten hours. The bomb is cooled and the oil is filtered at room temperature by gravity through No. 5 filter paper. The glass liner and filter paper are washed with naphtha. The amount of soluble residue in the filtrate is then determined by steam jet evaporation. The insoluble residue formed during the period of oxidation is dissolved from the liner and filter paper with a 50–50 mixture of acetone and methanol and is determined by air jet evaporation of the solution according to ASTM method D525–46. Both the soluble and the insoluble residue are expressed as milligrams per 100 ml. of fuel. A value for the insoluble residue of at least 3 milligrams per 100 ml. and sometimes appreciably higher appears to be acceptable to the trade. Soluble residue is somewhat less objectionable, although this depends somewhat on the way in which the fuel is burned. Furthermore the oil soluble residue may on further standing under oxidizing conditions become insoluble.

The following examples are illustrative of the improvement in stability which is obtained through the practice of this invention.

*Example 1*

Samples of freshly manufactured fuel oil No. 2 cracked by means of a fluid catalyst are inhibited with 0.005 percent by weight of various phenolic triamines and mixtures of triamines and metal deactivators. The inhibited oil samples are subjected to the stability tests described above, with the following results:

| Stabilizing Agent | Residue, mg./100 mls. | |
|---|---|---|
| | Soluble | Insoluble |
| None | 90 | 14 |
| 0.005% 2,4,6-tri(dimethylaminomethyl) phenol | 26 | 0.4 |
| 0.005% 2,4,6-tri(piperidinomethyl) phenol | 23 | 0.5 |
| 0.005% 2,4,6-tri(dimethylaminomethyl)-3-methyl-phenol | 31 | 0.8 |
| 0.005% 2,4,6-tri(dimethylaminomethyl)-3,5-dimethyl-phenol | 33 | 4.0 |
| 0.004% 2,4,6-tri(dimethylaminomethyl) phenol; 0.001% di(o-hydroxybenzal)1,2-diaminopropane | 22 | 0 |
| 0.004% 2,4,6-tri(dimethylaminomethyl) phenol; 0.001% o-hydroxybenzalaminoguanidine oleate | 28 | 0.8 |

*Example 2*

Samples of the same No. 2 fuel oil cracked with a fluid catalyst are treated with 0.005 percent of various phenolic triamines and mixtures of triamines and deactivators as in Example 1 and clean copper metal wire is added to each to catalyze its oxidation. The results on these samples obtained in the accelerated stability test previously described are shown in the following table.

| Stabilizing Agent | Residue, mg./100 mls. | |
|---|---|---|
| | Soluble | Insoluble |
| None | 91 | 12 |
| 0.005% 2,4,6-tri(dimethylaminomethyl) phenol | 43 | 1.2 |
| 0.005% 2,4,6-tri(piperidinomethyl) phenol | 62 | 1.8 |
| 0.005% 2,4,6-tri(dimethylaminomethyl)-3-methyl phenol | 57 | 5.3 |
| 0.005% 2,4,6-tri(dimethylaminomethyl)-3,5-dimethyl phenol | 67 | 6.4 |
| 0.004% 2,4,6-tri(dimethylaminomethyl) phenol; 0.001% o-hydroxybenzalaminoguanidine oleate | 35 | 1.2 |

*Example 3*

Samples of a different catalytically cracked fuel oil than is used in the preceding examples are treated with stabilizing agents and tested by the accelerated stability test, both with and without the addition of copper wire as oxidation catalyst. The results are as follows:

| Stabilizing Agent | Copper | Residue, mg./100 mls. | |
|---|---|---|---|
| | | Soluble | Insoluble |
| None | without | 74 | 3 |
| | with | 72 | 9 |
| 0.005% 2,4,6-tri(dimethylaminomethyl) phenol | without | 36 | 1.4 |
| | with | 49 | 2 |
| 0.005% o-hydroxybenzalaminoguanidine oleate | without | 32 | 1.2 |
| | with | 39 | 2 |
| 0.0025% 2,4,6-tri(dimethylaminomethyl) phenol; 0.0025% o-hydroxybenzalaminoguanidine oleate | without | 23 | 0 |
| | with | 44 | 0 |

These results indicate that the phenolic triamine and the o-hydroxyalkylideneamine exert a synergistic effect when used in conjunction with one another.

*Example 4*

Samples of a catalytically cracked fuel oil having an API gravity at 60° F. of 22.4 and a distillation range from 424° to 638° F. are inhibited with mixtures of 2,4,6-tri(dimethylaminomethyl) phenol and a metal deactivator. The samples of inhibited oil are then subjected to the accelerated stability test previously described. The samples are tested both with and without copper wire catalyst and the quantities of soluble and insoluble gummy residue are determined. The results of the test are as follows:

| Stabilizing Agent | Copper | Residue, mg./100 mls. | |
|---|---|---|---|
| | | Soluble | Insoluble |
| None | without | 111 | 6.8 |
| | with | 87.3 | 8.5 |
| 0.005% 2,4,6-tri(dimethylaminomethyl) phenol | without | 44.1 | 3.5 |
| | with | 53.6 | 5.3 |
| 0.005% 2,4,6-tri(dimethylaminomethyl) phenol; 0.0005% di(o-hydroxybenzal)1,2-diaminopropane | without | 30.4 | 3.3 |
| | with | 46.3 | 4.2 |
| 0.004% 2,4,6-tri(dimethylaminomethyl) phenol; 0.001% di(o-hydroxybenzal)1,2-diaminopropane | without | 31.7 | 3.1 |
| | with | 40.6 | 4.3 |
| 0.003% 2,4,6-tri(dimethylaminomethyl) phenol; 0.002% di(o-hydroxybenzal)1,2-diaminopropane | without | 34.4 | 2.0 |
| | with | 34.7 | 3.1 |
| 0.004% 2,4,6-tri(dimethylaminomethyl) phenol; 0.001% o-hydroxybenzalaminoguanidine oleate | without | 30.0 | 0.4 |
| | with | 42.0 | 1.0 |

*Example 5*

Samples of a catalytically cracked fuel oil having an API gravity of 22.2 at 60° F. and a distillation range of 437° to 640° F. are inhibited with various amounts of a mixture consisting of 10 percent by weight of di(o-hydroxybenzal)1,2-aminopropane and 90 percent by weight of 2,4,6-tri(dimethylaminomethyl) phenol. The samples are subjected to the same accelerated stability test as previously described. Tests are made both with and without copper metal catalyst with the following results:

| Wt. Percent of Inhibitor | Copper | Residue, mg./100 mls. | |
|---|---|---|---|
| | | Soluble | Insoluble |
| None | without | 119.9 | 17.9 |
| | with | 114.1 | 15.3 |
| 0.0005 | without | 102.2 | 11.6 |
| | with | 106.6 | 12.7 |
| 0.001 | without | 87.4 | 8.6 |
| | with | 103.1 | 12.8 |
| 0.005 | without | 39.8 | 3.1 |
| | with | 51.3 | 4.0 |
| 0.01 | without | 36.2 | 2.4 |
| | with | 46.1 | 2.6 |

It will be noted that these compounds are effective over a wide range of concentration.

Example 6

Samples of thermafor catalytically cracked fuel oil No. 2 distillate are treated with small amounts of di(o-hydroxybenzal)1,2-diaminopropane and with a mixture of this deactivator and 2,4,6-tri(dimethylaminomethyl) phenol. Tests were made with and without added copper catalyst.

The samples were subjected to an accelerated storage test in vented glass bottles at 110° F. for ten weeks. Ten weeks accelerated storage at 110° F. is believed to produce approximately the same amount of deterioration in fuel oils as will result from storage for one year under the normal conditions encountered in the field. At the end of the accelerated storage period the samples are compared in color using the ASTM NPA method. In this method the scale of grading is described as follows:

| | |
|---|---|
| 1 | lily white |
| 1½ | cream white |
| 2 | extra pale |
| 2½ | extra lemon pale |
| 3 | lemon pale |
| 3½ | extra orange pale |
| 4 | orange pale |
| 4½ | pale |
| 5 | light red |
| 6 | dark red |
| 7 | claret red |
| 8 | opaque |

A grading of 3— is intended to represent a color falling between 2½ and 3 on the scale. It will be seen that by this test the smaller the number the better the color of the oil. The test results are as follows:

| Stabilizing Agent | Copper | NPA Color | Residue, mg./100 mls. Soluble | Residue, mg./100 mls. Insoluble |
|---|---|---|---|---|
| None | without | 4— | 11.2 | 27.0 |
| | with | 5— | 22.4 | 38.4 |
| 0.0005% di(o-hydroxybenzal) 1,2-diaminopropane; 0.0045% 2,4,6-tri(dimethylaminomethyl) phenol. | without | 2+ | 5.4 | 9.6 |
| | with | 3 | 4.6 | 12.2 |
| 0.0005% di(o-hydroxybenzal) 1,2-diaminopropane. | without | 4— | 12.2 | 19.0 |
| | with | 5 | 23.4 | 37.2 |
| 0.004% di(o-hydroxybenzal) 1,2-diaminopropane. | without | 3½— | 12.6 | 11.6 |
| | with | 4— | 22.4 | 21.4 |

These data show that very considerable improvement in color and in both soluble and insoluble residue is achieved by the use of the combination of stabilizing agents herein disclosed.

Example 7

Samples of a fuel oil No. 2 distillate prepared by cracking with a fluid catalyst are inhibited with 0.01 percent by weight of a number of conventional gasoline antioxidants and rubber oxidation inhibitors. These samples together with a control sample of the oil and a sample stabilized with 0.01 percent by weight of 2,4,6-tri(dimethylaminomethyl) phenol are aged at 110° F. in vented glass bottles for ten weeks. The appearance of these samples after the storage period is summarized in the following table:

| Agent | Color | Precipitate |
|---|---|---|
| None | dark brown | heavy. |
| 2,4,6-tri(dimethylaminomethyl) phenol | light brown | slight. |
| N,N'-di(sec-butyl)-p-phenylene diamine | very dark | heavy. |
| N-(n-butyl)-p-aminophenol | do | Do. |
| phenyl-alpha-naphthylamine | do | Do. |
| p-hydroxyphenylmorpholine | do | very heavy. |
| p,p'-dimethoxydiphenylamine | do | Do. |
| 2,6-di(tert-butyl)-4-methylphenol | dark brown | heavy. |

It will be seen from the above data that the only sample which was better than the control was the one containing a phenolic triamine.

I claim:

1. A stabilized hydrocarbon distillate fuel oil normally subject to discoloration and sludge formation due to the presence of cracked components, containing as an inhibitor therefor from 0.0005 to 0.05 percent by weight of a phenolic triamine having the formula:

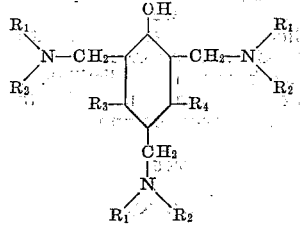

in which $R_1$ and $R_2$ are selected from the group consisting of methyl and ethyl radicals and divalent tetramethylene and pentamethylene radicals which jointly with the nitrogen atom form a heterocyclic ring, and $R_3$ and $R_4$ are selected from the group consisting of hydrogen, methyl and ethyl.

2. A stabilized hydrocarbon distillate fuel oil normally subject to discoloration and sludge formation due to the presence of cracked components, containing as an inhibitor therefor from 0.0005 to 0.05 percent by weight of 2,4,6-tri(dimethylaminomethyl) phenol.

3. A stabilized hydrocarbon distillate fuel oil normally subject to discoloration and sludge formation due to the presence of cracked components, containing as an inhibitor therefor from 0.001 to 0.01 percent by weight of 2,4,6-tri(dimethylaminomethyl) phenol.

4. A stabilized hydrocarbon distillate fuel oil normally subject to discoloration and sludge formation due to the presence of cracked components, containing as an inhibitor therefor from 0.001 to 0.01 percent by weight of 2,4,6-tri(piperidinomethyl) phenol.

5. A stabilized hydrocarbon distillate fuel oil normally subject to discoloration and sludge formation due to the presence of cracked components, containing as an inhibitor therefor from 0.0005 to 0.05 percent by weight of a mixture of 50 to 95 percent by weight of a phenolic triamine having the formula:

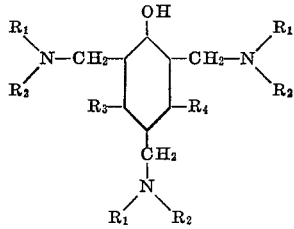

in which $R_1$ and $R_2$ are selected from the group consisting of methyl and ethyl radicals and divalent tetramethylene and pentamethylene radicals which jointly with the nitrogen atom form a heterocyclic ring, and $R_3$ and $R_4$ are selected from the group consisting of hydrogen, methyl and ethyl, and 5 to 50 percent by weight of an o-hydroxyaralkylidene aliphatic amine metal deactivator.

6. A stabilized hydrocarbon distillate fuel oil normally subject to discoloration and sludge formation due to the presence of cracked components, containing as an inhibitor therefor from 0.0005 to 0.05 percent by weight of a mixture of 50 to 95 percent by weight of 2,4,6-tri(dimethylaminomethyl) phenol and 5 to 50 percent by weight of an o-hydroxyaralkylidene alphatic amine metal deactivator.

7. A stabilized hydrocarbon distillate fuel oil normally subject to discoloration and sludge formation due to the presence of cracked components, containing as an inhibitor therefor from 0.0005 to 0.05 percent by weight of a mixture of 50 to 95 percent by weight of 2,4,6-tri(dimethylaminomethyl) phenol and 5 to 50 percent by weight of a N,N'-di(o-hydroxyaralkylidene) alkylenediamine metal deactivator in which the amino groups are attached to different carbon atoms in the alkylene group.

8. A stabilized hydrocarbon distillate fuel oil normally subject to discoloration and sludge formation due to the presence of cracked components, containing as an inhibitor therefor from 0.001 to 0.01 percent by weight of a mixture of 50 to 95 percent by weight of 2,4,6-tri(dimethylaminomethyl) phenol and 5 to 50 percent by weight of N,N'-di(o-hydroxybenzal)1,2-diaminopropane.

9. A stabilized hydrocarbon distillate fuel oil normally subject to discoloration and sludge formation due to the presence of cracked components, containing as an inhibitor therefor from 0.001 to 0.01 percent by weight of a mixture of 9 parts by weight of 2,4,6-tri(dimethylaminomethyl) phenol and 1 part by weight of N,N'di(o-hydroxybenzal)1,2-diaminopropane.

10. A stabilized hydrocarbon distillate fuel oil normally subject to discoloration and sludge formation due to the presence of cracked components, containing as an inhibitor therefor from 0.001 to 0.01 percent by weight of a mixture of 50 to 95 percent by weight of 2,4,6-tri(dimethylaminomethyl) phenol and 5 to 50 percent by weight of o-hydroxybenzalaminoguanidine oleate.

References Cited in the file of this patent

UNITED STATES PATENTS

| Number | Name | Date |
| --- | --- | --- |
| 2,181,121 | Downing et al. | Nov. 28, 1939 |
| 2,336,006 | Fuller | Dec. 17, 1943 |
| 2,363,134 | McCleary | Nov. 21, 1944 |
| 2,369,490 | Proell | Feb. 13, 1945 |
| 2,422,566 | Proell | June 17, 1947 |

OTHER REFERENCES

Bruson et al.: J. A. C. S., vol. 63, 1941.